United States Patent
Cutler

(10) Patent No.: US 7,697,839 B2
(45) Date of Patent: Apr. 13, 2010

(54) PARAMETRIC CALIBRATION FOR PANORAMIC CAMERA SYSTEMS

(75) Inventor: Ross G. Cutler, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 842 days.

(21) Appl. No.: 11/480,108

(22) Filed: Jun. 30, 2006

(65) Prior Publication Data

US 2008/0002023 A1 Jan. 3, 2008

(51) Int. Cl.
G03B 41/00 (2006.01)
H04N 7/00 (2006.01)
(52) U.S. Cl. .................................. 396/322; 348/36
(58) Field of Classification Search .............. 348/36, 348/38, 207.1, 222.1; 396/322, 335
See application file for complete search history.

(56) References Cited

U.S. PATENT DOCUMENTS

| | | | |
|---|---|---|---|
| 3,118,340 A | 1/1964 | Iwerks | |
| 6,834,965 B2 * | 12/2004 | Raskar et al. | 353/94 |
| 7,020,337 B2 | 3/2006 | Viola et al. | |
| 7,031,499 B2 | 4/2006 | Viola et al. | |
| 7,099,510 B2 | 8/2006 | Jones et al. | |
| 7,197,186 B2 | 3/2007 | Jones et al. | |
| 7,212,651 B2 | 5/2007 | Viola et al. | |
| 2003/0026588 A1 * | 2/2003 | Elder et al. | 386/46 |

* cited by examiner

*Primary Examiner*—Rodney E Fuller

(57) ABSTRACT

Architecture for spatially calibrating a multi-sensor panoramic camera. A panorama warping calibration model and manufacturing calibration data is characterized in a parametric model that is stored on the camera and utilized for camera calibration. Calibration techniques can employ combinations of intra-camera homography, inter-camera homography, and polynomial warps, which correct the error-free spatial panorama warping calibration model. Calibration system configuration can include a stationary camera system for spatial pattern testing for each camera and a rotational camera system for rotating a multi-sensor panoramic camera through a single spatial pattern.

20 Claims, 14 Drawing Sheets

PARAMETRIC CALIBRATION FOR PANORAMIC CAMERA SYSTEMS

BACKGROUND

The Internet has facilitated a more dispersed business environment by allowing employees, vendors, and customers to communicate and conduct business via e-mail and/or audio (telephone conferencing) techniques. However, such information exchange mechanisms lack the benefit of the more personal face-to-face contact that can provide a more effective and productive environment.

Existing video conferencing systems provide a limited view of a participant's work environment and are even less effective when the meeting requires drawings or sketching on a whiteboard, for example. Moreover, with the increasing numbers of user coming online and passing large files associated with multimedia content, the available bandwidth of existing networks is becoming even more burdened. Accordingly, businesses are continually seeking more effective means for video communications.

Panoramic cameras for wide-angle viewing find application not only for leisure, but also for personal reasons, home security, travel, gaming applications, and business meetings. With respect to business meetings, panoramic cameras can be utilized to record and broadcast meetings by recording not only the video images of the meeting environment, but also by providing a microphone array for recording audio input so viewers can see and hear most of what is happening.

Multi-camera (or omnidirectional) panoramic camera systems require calibration to ultimately be able to stitch the individual images together to make a seamless panoramic image. One conventional technique uses a brute-force approach by learning an arbitrary warp image from the cameras to the panoramic image. While very generic, this calibration technique is difficult to setup, includes a non-parametric file that is very large (on the order of megabytes), and impacts manufacturing production by taking a relatively long time (e.g., an hour or more) to complete, while providing little or no feedback to the manufacturer on the camera mechanics (e.g., lens/mirror alignment).

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The disclosed architecture provides techniques for parametrically characterizing and calibrating a panoramic camera and/or multi-panoramic camera system. A spatial warping model describes how to map pixels from the image sensor onto the panorama. A parametric model then describes this in only a few parameters, thereby providing a form of data compression resulting in a much smaller file for processing and storage. By including both the ideal panorama warping model and manufacturing calibration data in a parametric model, calibration accounts for manufacturing errors as well (e.g., lens alignment, mirror alignment, focal length, etc). The parametric model is stored in memory of the camera head for access by calibration processes. Calibration techniques can include processing of the ideal panorama warping model (Z) (e.g., a Zemax model) in combination with one or more of the following parametric correction models: intra-camera homography, inter-camera homography, and intra-camera affine. By including the parametric model in the camera head, calibrating and setup can be performed much faster at the manufacturer and also provides useful data to the manufacturer that helps improve quality and yield.

An alternative hybrid calibration approach utilizes a sub-pixel calibration at a seam region of test patterns and the parametric model, elsewhere. The hybrid approach uses polynomials near the seam, but still uses homography (H) and manufacturing model Z (for H+Z) in other regions. This is a parametric approach, since the polynomials are parametric. In other words, it is a dual-parametric approach to improve modeling accuracy but still maintain the advantages of parametric modeling.

A low-order polynomial warp can be employed in place of homography. Alternatively, measured boarder values on large grid sizes can be utilized rather than a polynomial warp.

Calibration system configuration can include a fixed camera system for spatial pattern testing for each camera and a rotational calibration system configuration for rotating a multi-camera system through a single spatial pattern.

In one implementation, the modeled calibration parameters consist of about forty values totaling approximately 160 bytes. Thus, the reduced size in the calibration model allows the parameters to be stored in the camera head in inexpensive non-volatile memory. This allows the camera manufacturer to create self-contained camera and calibration data without requiring calibration files to be stored in memory external to the camera (e.g., in a base stabilization subsystem). Additionally, this simplifies system assembly and reduces overall cost. Moreover, if camera replacement is required, replacement and camera operation is expedited in an optimum way, since the correct calibration file is always maintained with the camera.

In support thereof, the architecture disclosed and claimed herein comprises a system that facilitates calibration of panoramic cameras. A model component is provided for generating a parametric model of data associated with a camera. A storage component facilitates storage the parametric model in association with the camera, and a calibration component employs the parametric model for spatial calibration of the camera.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
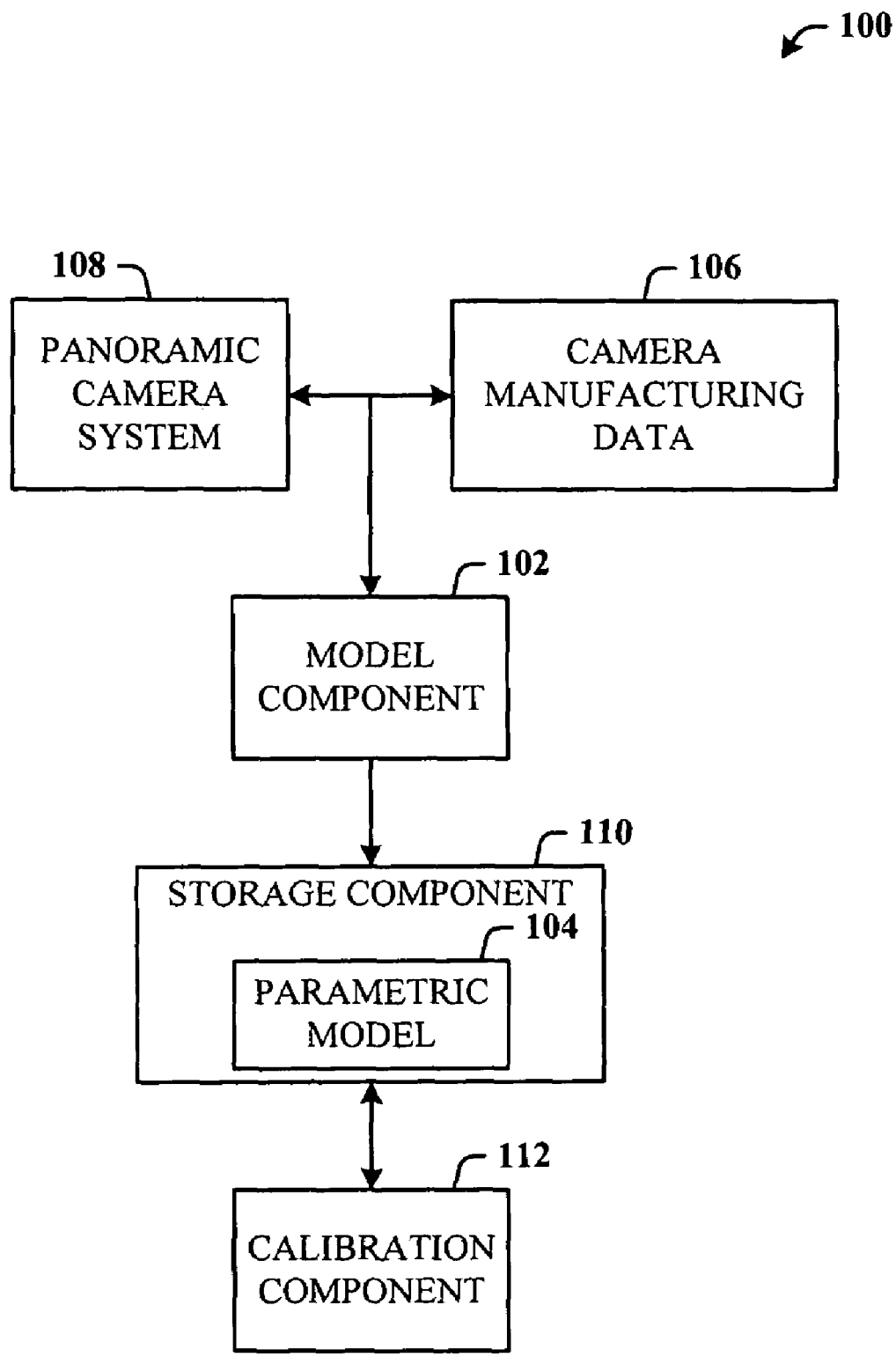
FIG. 1 illustrates a system that facilitates calibration of panoramic cameras at the manufacturer.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The disclosed architecture provides techniques for parametrically characterizing and calibrating a panoramic camera and/or multi-panoramic camera system. A parametric model is generated that includes an ideal panorama warping model (or Z), which is data common for all cameras (e.g., via manufacturing), and data that is specific to each camera manufactured (manufacturing correction data), thereby addressing manufacturing issues related to manufacture of at least that specific camera. Thereafter, the parametric model is stored in memory of the camera head for access by calibration processes at the manufacture or any time thereafter.

Referring initially to the drawings, FIG. 1 illustrates a system 100 that facilitates calibration of panoramic cameras at the manufacturer. A model component 102 is provided for generating a parametric model 104 of manufacturing data 106 associated with a panoramic camera system 108 (e.g., one or more panoramic cameras). A storage component 110 facilitates storage of the parametric model 104 in association with the camera system 108, and a calibration component 112 employs the parametric model 104 for spatial calibration of the camera system 108.

The model component 102 can receive and process the ideal panorama warping model developed by the manufacturer and, facilitate generation of one or more correction models (e.g., inter-camera homography, intra-camera homography, and affine models), the combined processing of one or more with the manufacturing data model 106 provide the parametric model 104 for parametric calibration of the camera system 108 by the calibration component 112. The parametric model 104 can then be stored in the storage component 110 (e.g., non-volatile memory) on the camera head as a file significantly smaller in size than the manufacturer data model 106. Thus, this calibration parametric model information stays with the camera at all times for quick and easy access for any desired processes after the manufacturing phase (e.g., by an end-user).

Figure 2:
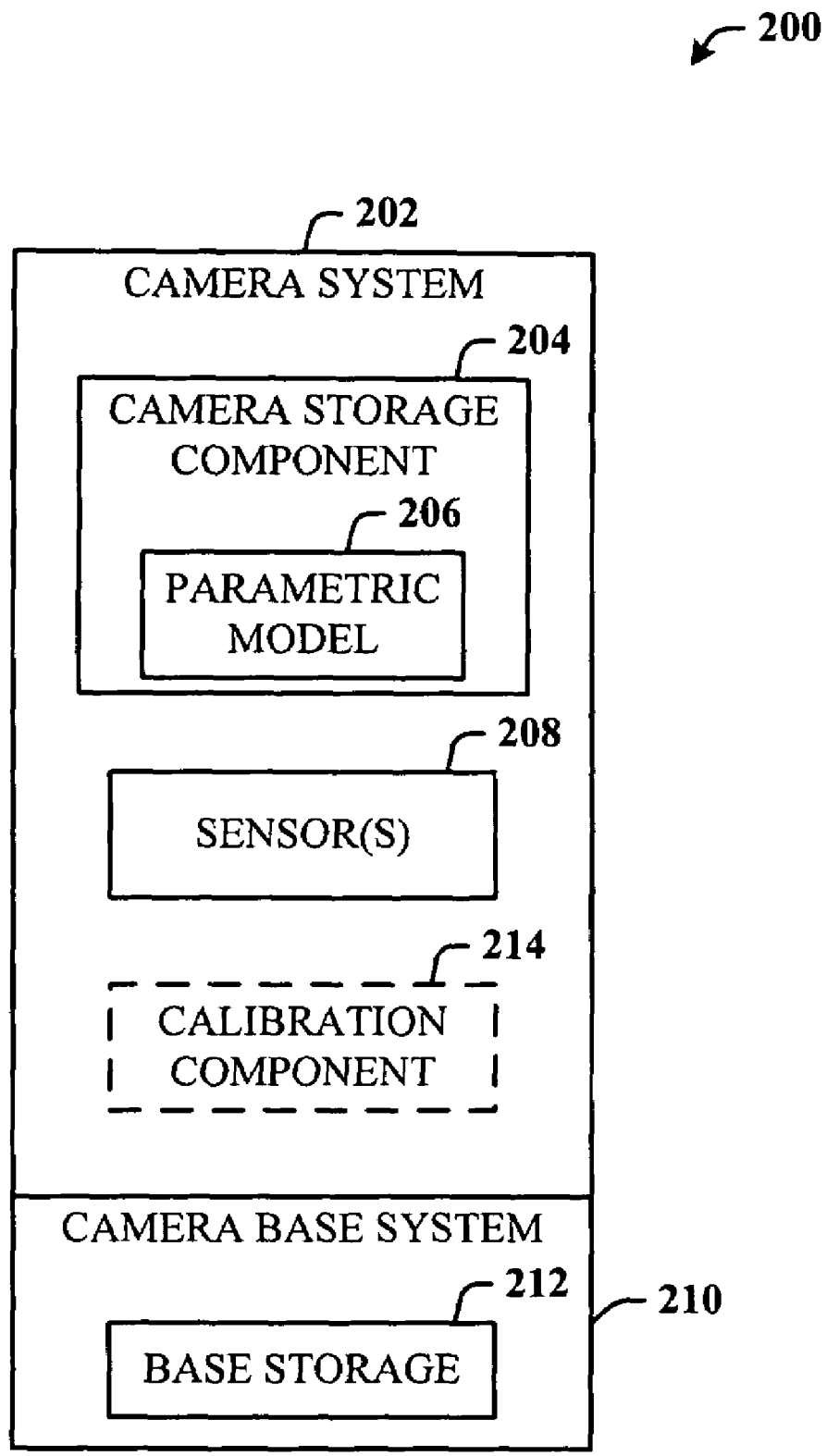
FIG. 2 illustrates a camera system that facilitates camera calibration.

FIG. 2 illustrates a more detailed camera system 200 that facilitates camera calibration. The system 200 includes a panoramic camera 202 having a camera storage component 204 (e.g., non-volatile memory such as EEPROM or flash memory) for storing a parametric model 206 that, in part, includes the ideal panorama warping model and manufacturing calibration information associated with manufacture of the camera 202. The camera 202 can also include one or more sensors 208 for capturing images and optionally, for sensing other information desired (e.g., audio, lighting, . . . ). A camera base system 210 includes base memory storage 212 for storing the manufacturing data (denoted Z), and code for generating a non-parametric stitching table from the combination Z+H. Optionally, the camera 202 can include a calibration component 214 that accesses the storage component 204 to retrieve and process the parametric model 206 for at least spatial calibration processes (e.g., using vertical stitching patterns).

The camera 202 can be a still panoramic camera for capturing multiple separate images and facilitating generation of a panoramic view.

By including the parametric model 206 in the storage component 204 of the camera head, calibrating and setup can be performed much faster at the manufacturer and also provides useful data to the manufacturer that helps improve quality and yield.

In one implementation, the modeled calibration parameters include about forty values totaling approximately 160 bytes, rather than conventional applications requiring 330K numbers (totaling about 1.3 MB). Thus, the reduced size in the calibration parameters allows the parameters to be stored in the camera head in inexpensive non-volatile memory (e.g., EEPROM or flash). This allows the camera manufacturer to create self-contained camera and calibration data without requiring calibration files to be stored in memory external to the camera (e.g., in a base stabilization subsystem). This further simplifies system assembly and reduces overall cost. Additionally, if camera replacement is required, replacement and camera operation is expedited in an optimum way, since the correct calibration file is always maintained with the camera.

The calibration component 208 of each camera can be configured to auto-initiate calibration on power-up, for example, and/or periodically during camera operation. Alternatively, the calibration component of each camera can receive one or more commands from a central control component (not shown) that initiates calibration for that particular camera. These are only but a few examples of calibration control that can be employed, and are not to be construed as limiting in any way.

Figure 3:
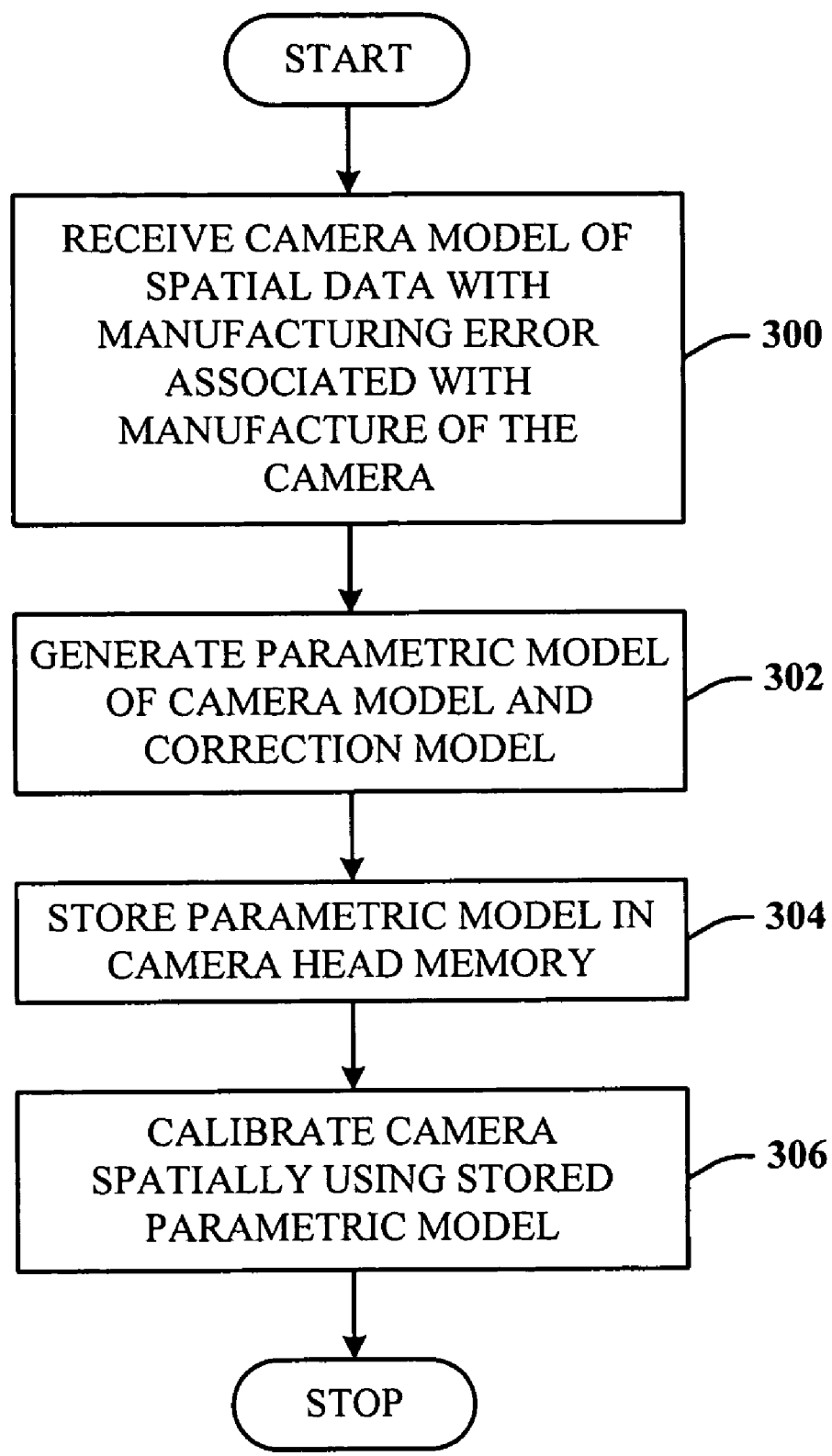
FIG. 3 illustrates a methodology of calibrating a camera system.

FIG. 3 illustrates a methodology of calibrating a camera system. While, for purposes of simplicity of explanation, the one or more methodologies shown herein, for example, in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 300, known panorama warping model (that includes spatial mapping data with manufacturing error) associated with a panoramic camera is received. At 302, a parametric model of both the camera model and correction model for correcting the manufacturing error is generated. At 304, the parametric model is stored in memory in the camera head. At 306, the camera is calibrated spatially by accessing the parametric model from the memory and processing the parametric model.

Figure 4:
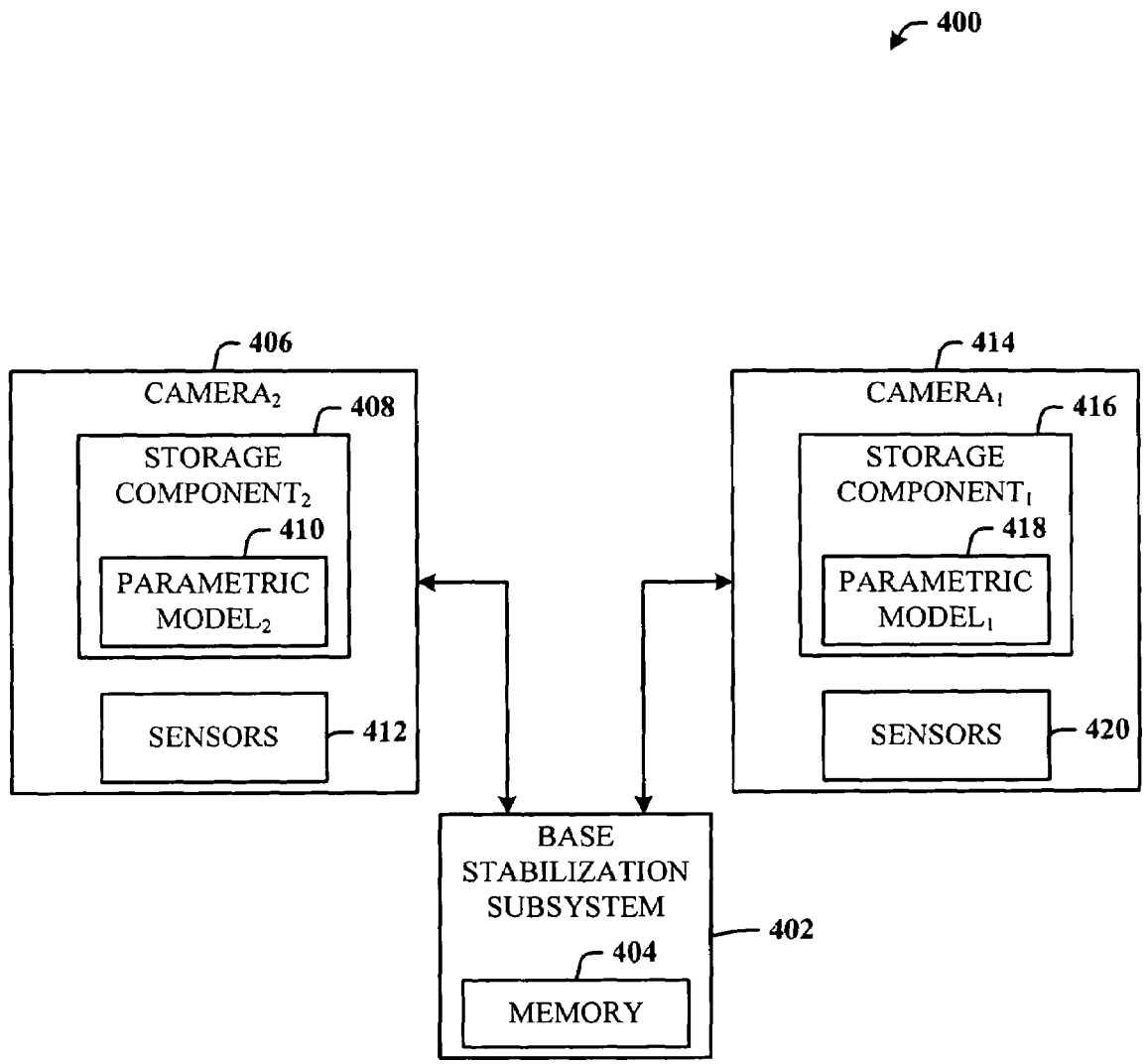
FIG. 4 illustrates a multi-panoramic camera system mounted in cooperation with a base stabilization subsystem for omnidirectional video processing.

FIG. 4 illustrates a multi-panoramic camera system 400 (e.g., a 2-camera system) mounted in cooperation with a base stabilization subsystem 402 for omnidirectional video processing, the base subsystem 402 also including a memory 404 for storing the camera model of manufacturing data errors. Here, a first camera 406 includes a first storage component 408 for storing a first parametric model 410 that models parametrically at least camera, and manufacturing data for this first camera 406, and multiple sensors 412.

Similarly, a second camera 414 includes a second storage component 416 for storing a second parametric model 418 that models parametrically at least camera and manufacturing data for this second camera 414 (and which can be accessed for execution during a calibration phase), and multiple sensors 420.

In this particular implementation, the cameras (406 and 414) can undergo calibration simultaneously or separately. It is to be appreciated that calibration control can be configured in any manner desired.

Figure 5:
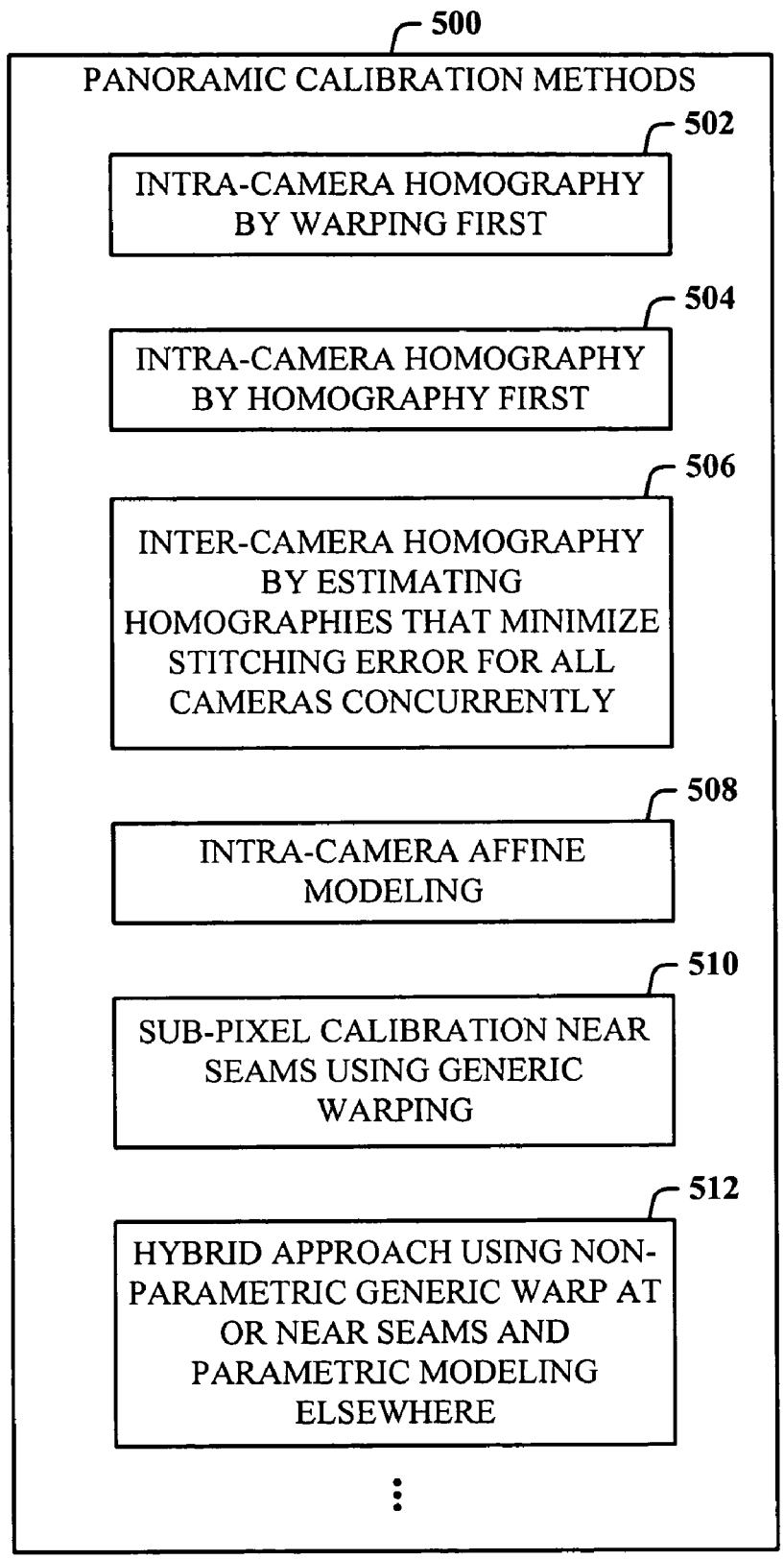
FIG. 5 illustrates a number of calibration methods that can be employed for parametric camera calibration.

FIG. 5 illustrates a number of calibration methods 500 that can be employed for parametric camera calibration. In one method, homography is utilized. A homography is a planar mapping between two camera viewpoints of the same scene. In other words, in the context of video processing, a goal is to find homography between any two images in a video sequence, and the point correspondences between consecutive frames can be used to define these transformations. The process of the point correspondence generation can be fully automated.

A first method 502 is intra-camera homography by first warping an image into a rectilinear representation using the panorama warping model. A second method 504 is a variation on the first method 502 of intra-camera homography by performing homography before image warping. A third method 506 is inter-camera homography by estimating homographies that minimize stitching error for all cameras concurrently. A fourth method 508 is intra-camera affine modeling, where an affine transformation is a transformation that preserves lines and parallelism (e.g., maps parallel lines to parallel lines).

A fifth method 510 is sub-pixel (e.g., 0.1 of a pixel) calibration near seams using generic (non-parametric) warping. This method provides sub-pixel calibration near the seams if the Z model plus homography correction is an accurate model for the real camera. A sixth method 512 is a hybrid approach that utilizes non-parametric generic warping (e.g., quadrilaterals to rectangles) at or near the seams and parametric modeling elsewhere. This hybrid approach has all of the advantages of the parametric model, but is very robust to lens distortions or other deviations from the camera model. The sixth method can also be parametric using vertical and horizontal polynomials, where the intersections are the corner points in the target. Other methodologies can be employed, which are not described herein.

A low-order (e.g., $3^{rd}$ order, $5^{th}$ order) polynomial warp can be utilized rather than a homography. This is another parametric method. Additionally, when large grid sizes are employed, measured (or smoothed) values on the boarders can be utilized.

The first method 502 of intra-camera homography first warps an image into a rectilinear representation. In this first method, the calibration process determines a mapping function $M_c$ that maps image points $q_{c,i}$ (for a camera c and point i) to panorama points $p_{c,i}$, as represented by the following three relationships.

$$p_{c,i} = M_c(q_{c,i})$$

$$p_{c,i} = \begin{pmatrix} x_{c,i} \\ y_{c,i} \end{pmatrix}$$

$$q_{c,i} = \begin{pmatrix} u_{c,i} \\ v_{c,i} \end{pmatrix}$$

Figure 6:
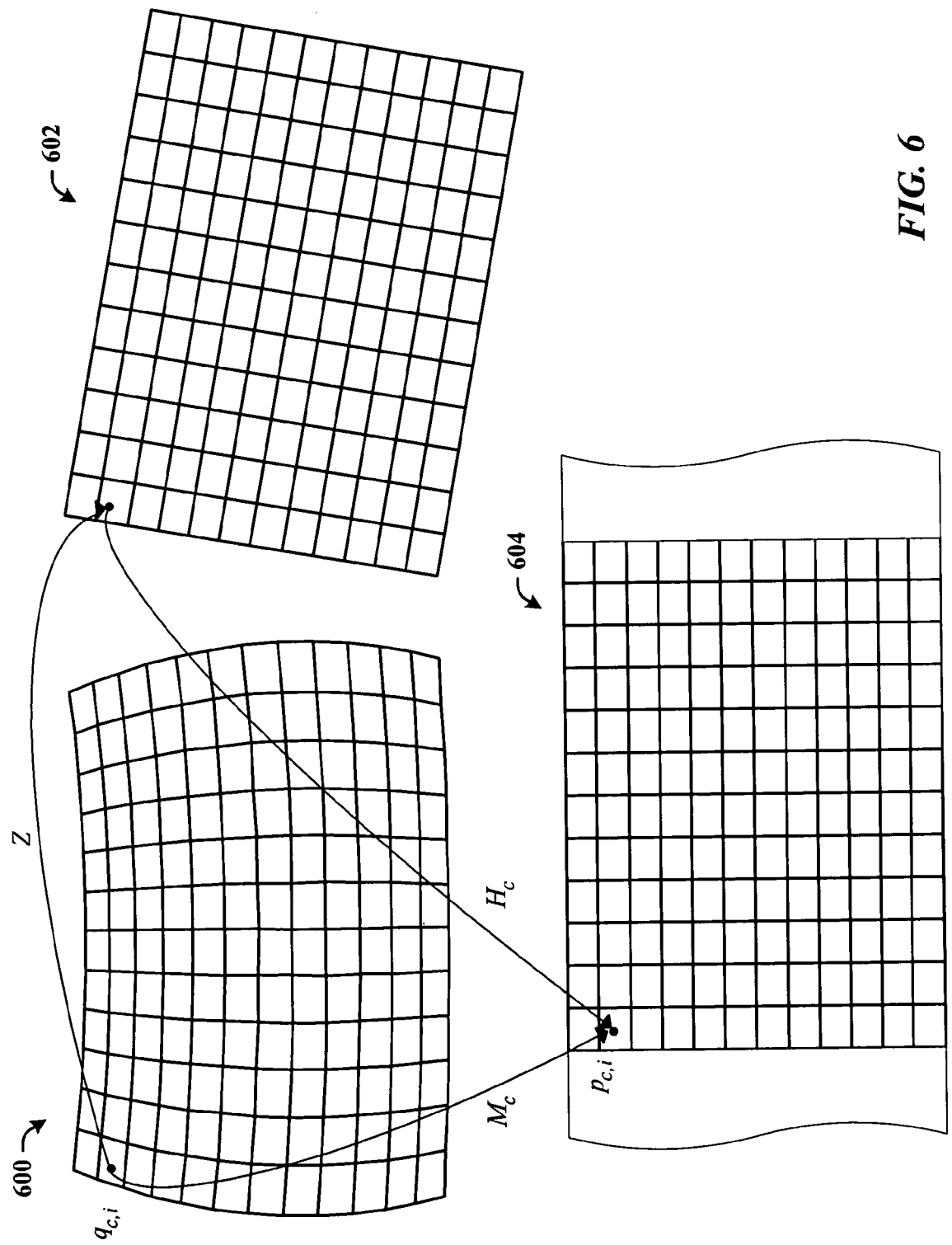
FIG. 6 illustrates the intra-camera homography process that first warps an image to be rectilinear as part of mapping the image to panoramic space.

FIG. 6 illustrates the intra-camera homography process that first warps an image to be rectilinear as part of mapping the image to panoramic space. As illustrated, an initial image 600 $M_c$ can be approximated by a first warping the image 600 into a rectilinear image 602 via a transformation operation Z, and then further warping the rectilinear image 602 into a panorama image 604 using a homography ($H_c$). The rectilinear mapping is Z and can be provided by a modeling tool for optical design (e.g., ZEMAX by ZEMAX Development Corporation) of the camera. The homography $H_c$ accounts for manufacturing errors and misalignments, for example. The new mapping is represented in equality (1):

$$\tilde{p}_{c,i} = H_c Z(q_{c,i}) \quad (1)$$

where $\tilde{p}_{c,i}$ is the homogeneous equivalent of $p_{c,i}$.

Let $\tilde{q}_{c,i}$ be the homogeneous equivalent to $Z(q_{c,i})$:

$$\tilde{q}_{c,i} = \begin{pmatrix} Z(q_{c,i}) \\ 1 \end{pmatrix}$$

Thus, $$\tilde{p}_{c,i} = H_c \tilde{q}_{c,i}$$

Let $H_c$ be a column of row vectors:

$$H_c = \begin{pmatrix} h_{c,1}^T \\ h_{c,2}^T \\ h_{c,3}^T \end{pmatrix}$$

The solution to $H_c$ in (1) is given by:

$$\begin{pmatrix} 0 & -\tilde{q}_{c,i} & y_{c,i}\tilde{q}_{c,i} \\ \tilde{q}_{c,i} & 0 & -x_{c,i}\tilde{q}_{c,i} \end{pmatrix} \begin{pmatrix} h_{c,1} \\ h_{c,2} \\ h_{c,3} \end{pmatrix} = 0$$

which can be written as:

$$A_c h = 0$$

The solution to h is the eigenvector that corresponds to the smallest eigenvalue, which can be determined by taking the singular value decomposition (SVD) of $A_c$. SVD is a set of techniques dealing with sets of equations or matrices that are either singular, or numerically very close to singular, and allows for the diagnosing of problems in a given matrix and provides a numerical answer as well. The key to solving this is that most of the points p are on the seam, so that the solution minimizes modeling error near the seam, which results in a more seamless panorama.

Figure 7:
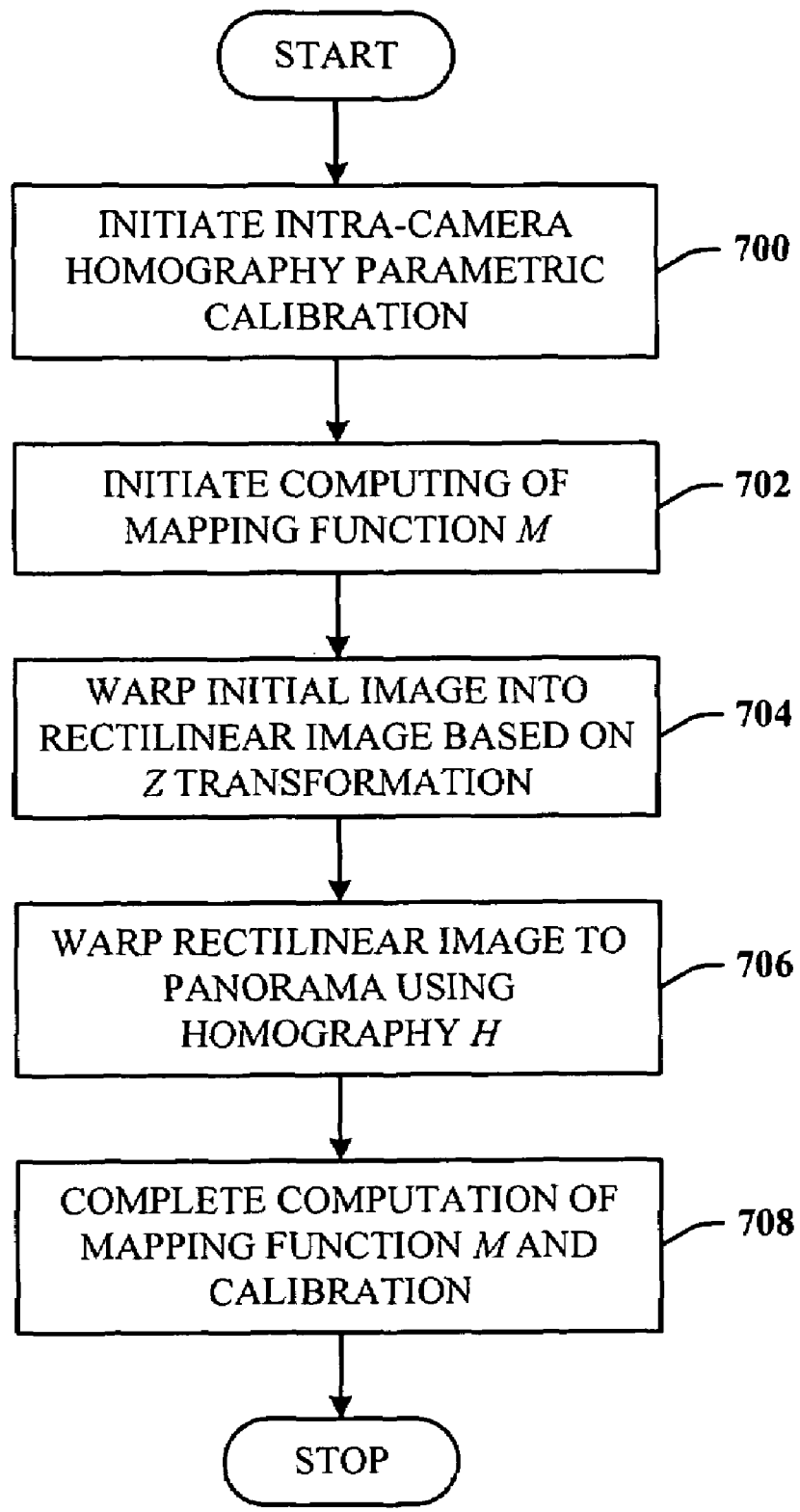
FIG. 7 illustrates a methodology of calibrating according to intra-camera homography.

FIG. 7 illustrates a methodology of calibrating according to intra-camera homography. At 700, parametric calibration by intra-camera homography is initiated. At 702, computation of a mapping function $M_c$ is initiated. At 704, an initial image is warped into a rectilinear image. At 706, the rectilinear image is further warped into a panoramic image using homography. At 708, computation of the mapping function M and parametric calibration is completed.

Note that this first method 502 could have reversed the order of the homography and warping to arrive at the second method 504:

$$p_{c,i} = Z(H_c \tilde{q}_{c,i})$$

Figure 8:
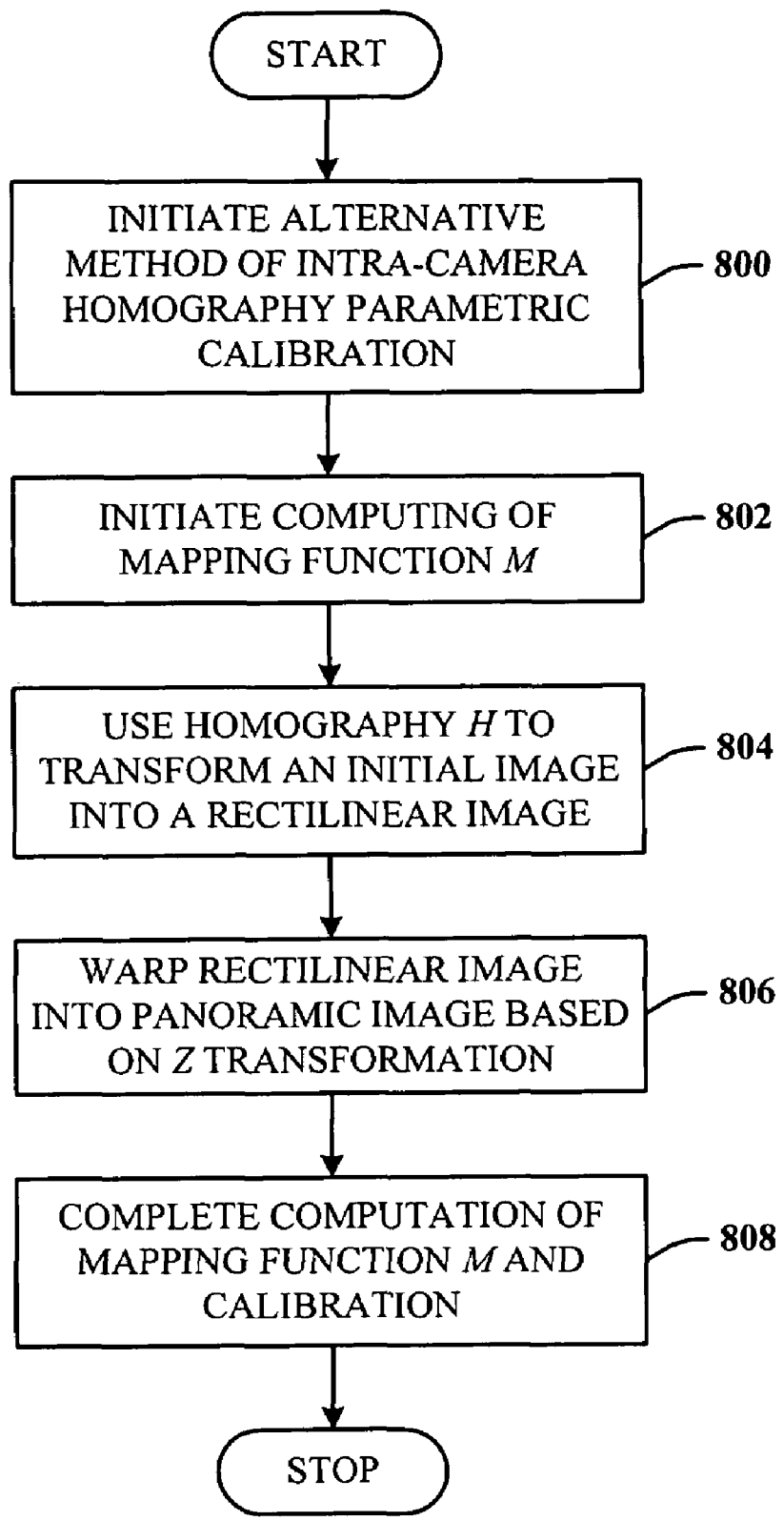
FIG. 8 illustrates a methodology of intra-camera parametric calibration by performing homography on the initial image to obtain the rectilinear image.

This second method 502 has an advantage that homography can now better model a rotation or tilt in the camera mirror, before the lens warps the image. However, it can be more difficult to solve, as Z is non-linear, and iterative methods should now be applied rather than closed form linear methods. Accordingly, FIG. 8 illustrates a methodology of intra-camera parametric calibration by performing homography on the initial image to obtain the rectilinear image. At 800, parametric calibration by intra-camera homography is initiated. At 802, computation of a mapping function $M_c$ is initiated. At 804, homography H is employed to transform the initial image into the rectilinear image. At 806, the rectilinear image is further warped into the panoramic image using the Z transformation. At 808, computation of the mapping function M and parametric calibration is completed.

To generate a new calibration file using homography, find $q_{c,i}$ for grid points $\tilde{p}_{c,i}$:

$$\tilde{p}_{c,i} = H_c Z(q_{c,i})$$

$$H_c^{-1} \tilde{p}_{c,i} = Z(q_{c,i})$$

$$q_{c,i} = Z^{-1}(H_c^{-1} \tilde{p}_{c,i})$$

The intra-camera methods described above optimize homography for each camera independently. An alternative method is the third method 506 of FIG. 5 of estimating homographies that minimize stitching error for all cameras simultaneously. This is a more difficult problem to solve, since instead of five 8-dimensional problems, there is now one 40-dimensional problem. However, the method is more likely to give better results as far as stitching error is concerned.

The basic constraint between two cameras can be defined as:

$$H_c \tilde{q}_{c,i} = H_{c+1} \tilde{q}_{c+1,i}$$

This can be expanded into the following:

$$\frac{h_{c,1}^T \tilde{q}_{c,i}}{h_{c,3}^T \tilde{q}_{c,i}} = \frac{h_{c+1,1}^T \tilde{q}_{c+1,i}}{h_{c+1,3}^T \tilde{q}_{c+1,i}}$$

$$\frac{h_{c,2}^T \tilde{q}_{c,i}}{h_{c,3}^T \tilde{q}_{c,i}} = \frac{h_{c+1,2}^T \tilde{q}_{c+1,i}}{h_{c+1,3}^T \tilde{q}_{c+1,i}}$$

$$h_{c+1,3}^T \tilde{q}_{c+1,i} h_{c,1}^T \tilde{q}_{c,i} - h_{c+1,1}^T \tilde{q}_{c+1,i} h_{c,3}^T \tilde{q}_{c,i} = 0$$

$$h_{c+1,2}^T \tilde{q}_{c+1,i} h_{c,1}^T \tilde{q}_{c,i} - h_{c+1,1}^T \tilde{q}_{c+1,i} h_{c,2}^T \tilde{q}_{c,i} = 0$$

Figure 9:
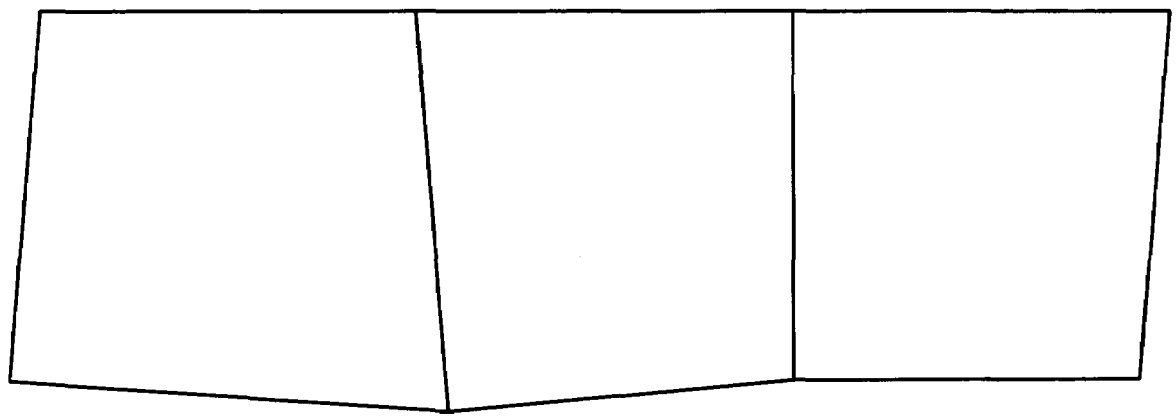
FIG. 9 illustrates an exaggerated view of three contiguous camera images stitched together with homographies.

This is a non-linear optimization problem and iterative techniques can be used. FIG. 9 illustrates an exaggerated view of three contiguous camera images stitched together with homographies.

Calibration with this third method 506 of FIG. 5 can be performed automatically without any test patterns. This third method 506 maximizes image correlation in the overlap region to determine the calibration parameters. However, the homography learned will use the object distance implicitly, so background objects (e.g., walls) should not be used. Objects that can be ideal to use for calibration are the people around a conference table, which can be verified with the MPD (multi-person detection). Using this method, the calibration could be continuously updated to optimize for various table sizes on which the camera system will be positioned.

A simpler correction than a homography is the affine model (or fourth method 508 of FIG. 5), which preserves parallel lines. The solution for the affine matrix $A_c$ can be given below.

$$\begin{pmatrix} \tilde{u}_{c,i} \\ \tilde{v}_{c,i} \end{pmatrix} = Z \begin{pmatrix} u_{c,i} \\ v_{c,i} \end{pmatrix}$$

$$\begin{pmatrix} x_{c,1} & x_{c,1} \\ \cdots & \\ x_{c,n} & y_{c,n} \end{pmatrix} = \begin{pmatrix} \tilde{u}_{c,1} & \tilde{v}_{c,1} & 1 \\ \cdots & & \\ \tilde{u}_{c,n} & \tilde{v}_{c,n} & 1 \end{pmatrix} \begin{pmatrix} a & d & 1 \\ b & e & 1 \\ c & f & 1 \end{pmatrix}$$

$$X = UA_c$$

$$A_c = U^{-1} X$$

Many different programs can be employed to solve for $A_c$. Note if there is systemic skewing in the y coordinates, this can be corrected if a homography is used.

A very useful application of the affine model is to diagnose camera manufacturing. Specifically, the matrix $A_c$ is a composition of rotation, non-isotropic scaling, and translation, represented as follows:

$$A_c = \begin{pmatrix} R & 0 \\ t & 1 \end{pmatrix}$$

For this camera:

$$A_c = \begin{pmatrix} 1.0710 & 0.0056 & 0 \\ -0.0038 & 0.9948 & 0 \\ -42.8032 & 3.5586 & 1 \end{pmatrix}$$

The rotation matrix can be analyzed using SVD to decompose the rotation and scaling. For this camera, $\theta = 0.26$ degrees, $s_x = 1.0710$, and $s_y = 0.9948$. The translation is $t_x = -42.8032$ and $t_y = 3.5586$ pixels.

One calibration configuration uses J calibration patterns for calibrating a J-camera system, where J is a positive integer. For example, five patterns would be required for a five-camera omnidirectional video camera calibration system (see FIG. 12). Moreover, such a system can require a larger footprint for setup.

The calibration system configurations can include a fixed camera system for spatial pattern testing for each camera and a rotational calibration system configuration for rotating single and multi-panoramic cameras through a single spatial pattern or multiple test patterns.

Figure 10:
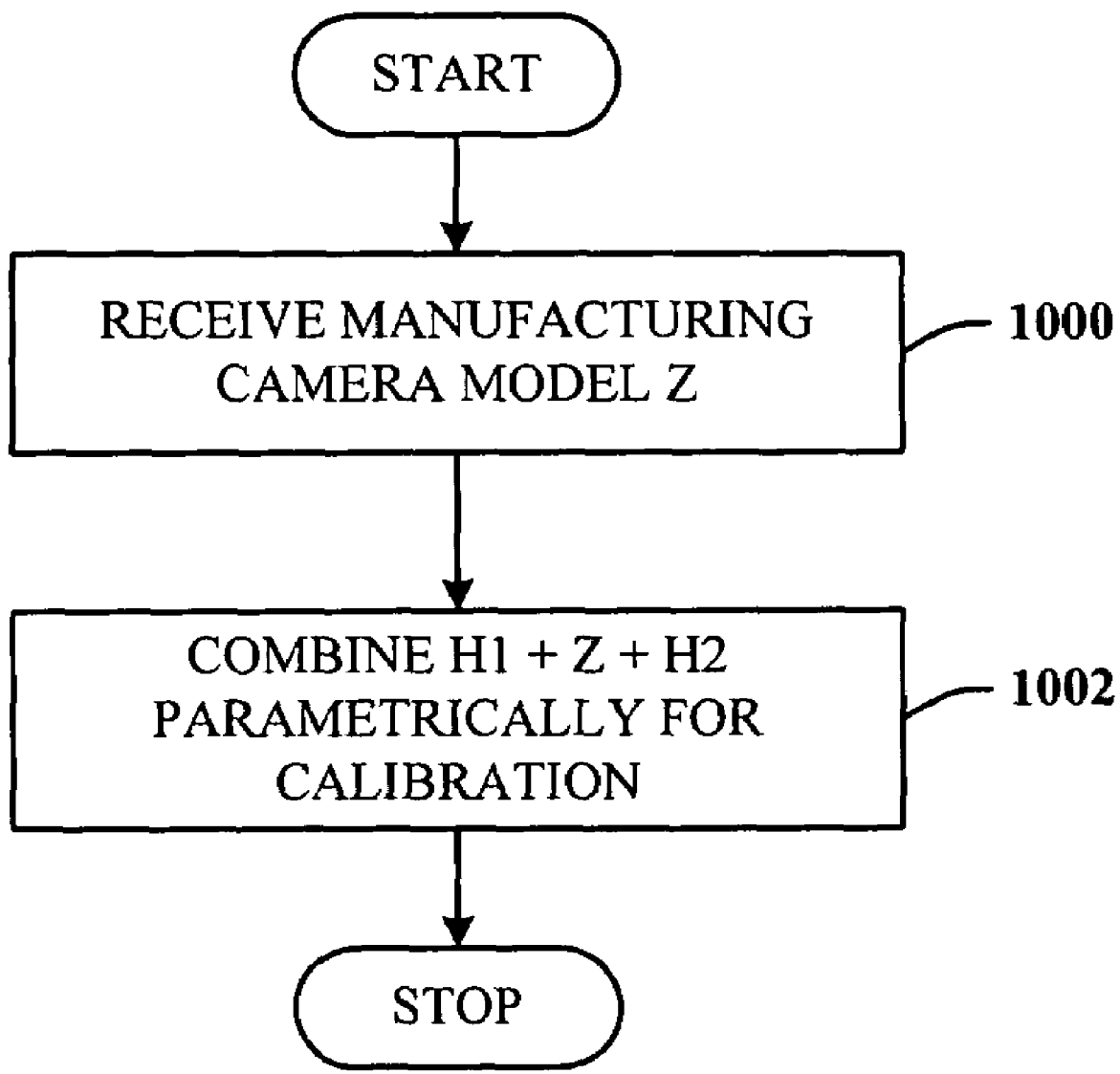
FIG. 10 illustrates a methodology of calibrating a multi-sensor camera using two homographies.

FIG. 10 illustrates a methodology of calibrating a multi-sensor camera using two homographies. At 1000, the panorama warping model Z is received. At 1002, the homographies $H_1$ and $H_2$ are combined with Z parametrically for calibration in this way: $p=H_1(Z(H_2(q)))$. This is denoted the $H_1+Z+H_2$ model.

Figure 11:
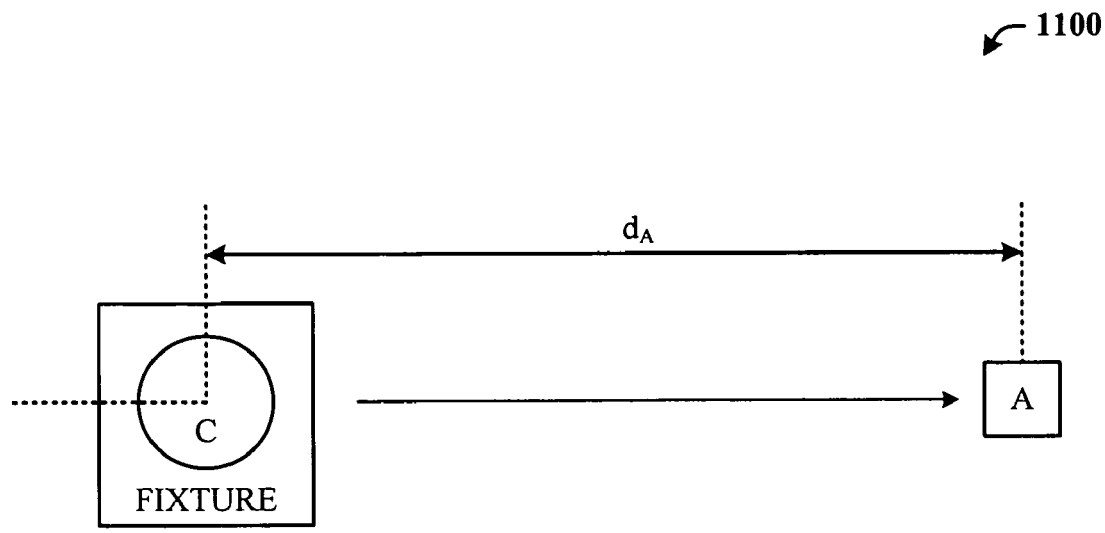
FIG. 11 illustrates an exemplary calibration system configuration for a single panoramic camera calibration system.

FIG. 11 illustrates an exemplary calibration system configuration 1100 for a single panoramic camera calibration system. Here, the single panoramic camera (denoted C) is mounted on a fixture. A spatial test pattern is suitably positioned at a distance $d_A$ in front of the camera to facilitate calibration. This distance replicates the distance normally experienced between the camera and an object in a working setting.

Figure 12:
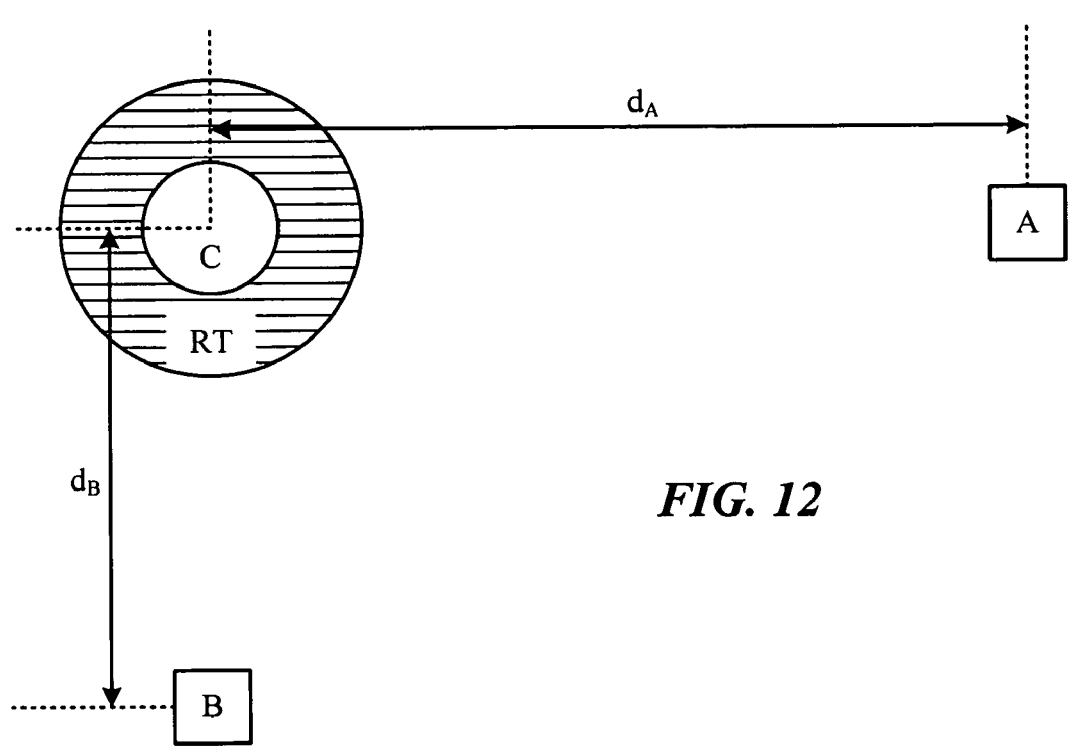
FIG. 12 illustrates an exemplary calibration system configuration for multi-sensor camera calibration using multiple test patterns and a rotation table.

FIG. 12 illustrates an exemplary calibration system configuration 1200 for a multi-sensor camera using multiple test patterns and a rotation table. Here, the single panoramic camera (denoted C) is mounted on a rotation table (denoted RT) having two test patterns suitably positioned to mimic distances when placed in a working environment (e.g., a conference room). A first calibration pattern (denoted A) is located at an approximate distance $d_A$ (e.g., one meter) from the camera C (this can be the camera center, if desired). A second calibration pattern (denoted B) is positioned at an angle from an imaginary line traversing the distance between the camera C and the first calibration pattern A, that is suitable for presenting the second calibration pattern B at an approximate distance $d_B$ (e.g., one-half meter) from the camera C. Although two test patterns (A and B) are shown, only one can be required.

In operation, the rotation table can be rotated under control of a digital servo system (not shown), for example, or other similarly precise mechanical means that provide precise angular rotation of the camera to the desired positions to capture the test patterns.

In a multi-test pattern implementation, when not using a rotation table, this setup could require twice the longest distance $d_A$ (e.g., two meters) diameter in multi-camera calibration setup, thereby taking up more space at the manufacture than is needed. However, the footprint and setup required for the non-RT implementation can be simulated and reduced by using a rotation table, by rotating the camera through the target capture process for patterns A and B.

Accordingly, in one implementation, the camera system is rotated on the rotation table RT such that in a single camera system, the camera is rotated into a first position to capture the calibration pattern A, and then rotated into a second position to capture the second calibration pattern B, or vice versa.

Figure 13:
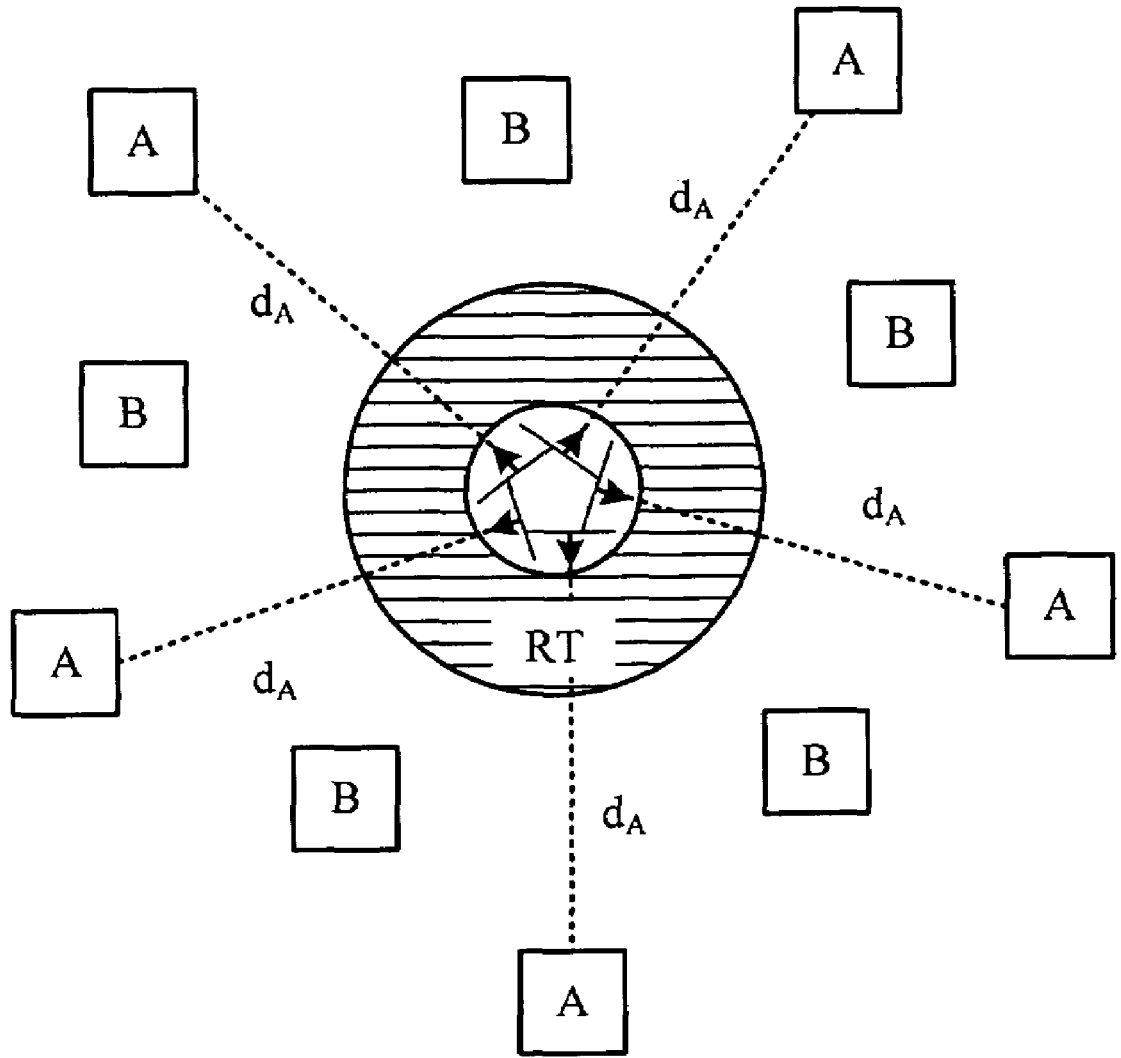
FIG. 13 illustrates an alternative calibration configuration for a five-camera system arranged in a cylindrical orientation using only two calibration patterns.

FIG. 13 illustrates an alternative calibration configuration for a five-camera system arranged in a cylindrical orientation using only two calibration patterns. Here, the camera system is positioned on the rotation table (RT) around which are located equidistantly and of similar angles five calibration patterns A and B. One set of patterns (A or B) is offset from the other set of patterns (B or A) such that a slight rotation of the camera system moves each camera into position to capture the respective calibration pattern. For example, in a first position where the five cameras are oriented to capture the calibrations patterns A, all cameras are then activated to capture the pattern A concurrently.

Alternatively, each camera can be signaled to captures its corresponding pattern A sequentially. In yet another implementation, fewer than five but more than one of the cameras are triggered to capture the corresponding calibration pattern A. Next, the RT is rotated into a second position so that the capture process can be repeated for the second calibration pattern B, as can be performed in one or more of the signaling or triggering scenarios mentioned above.

Figure 14:
FIG. 14 illustrates an exemplary pattern for spatial calibration.

FIG. 14 illustrates an exemplary pattern 1400 for spatial calibration. The pattern 1400 includes a two-wide checkerboard strip and a parallel line extending along the length of the strip. This pattern can be utilized for an H+Z model. In one calibration implementation for this pattern, the camera is controlled to look up about 29.5 degrees along the vertical strip and down about 20 degrees for calibration purposes. In alternative implementation, a 14-column pattern can be utilized for a dual parametric (or P+H+Z) model.

Figure 15:
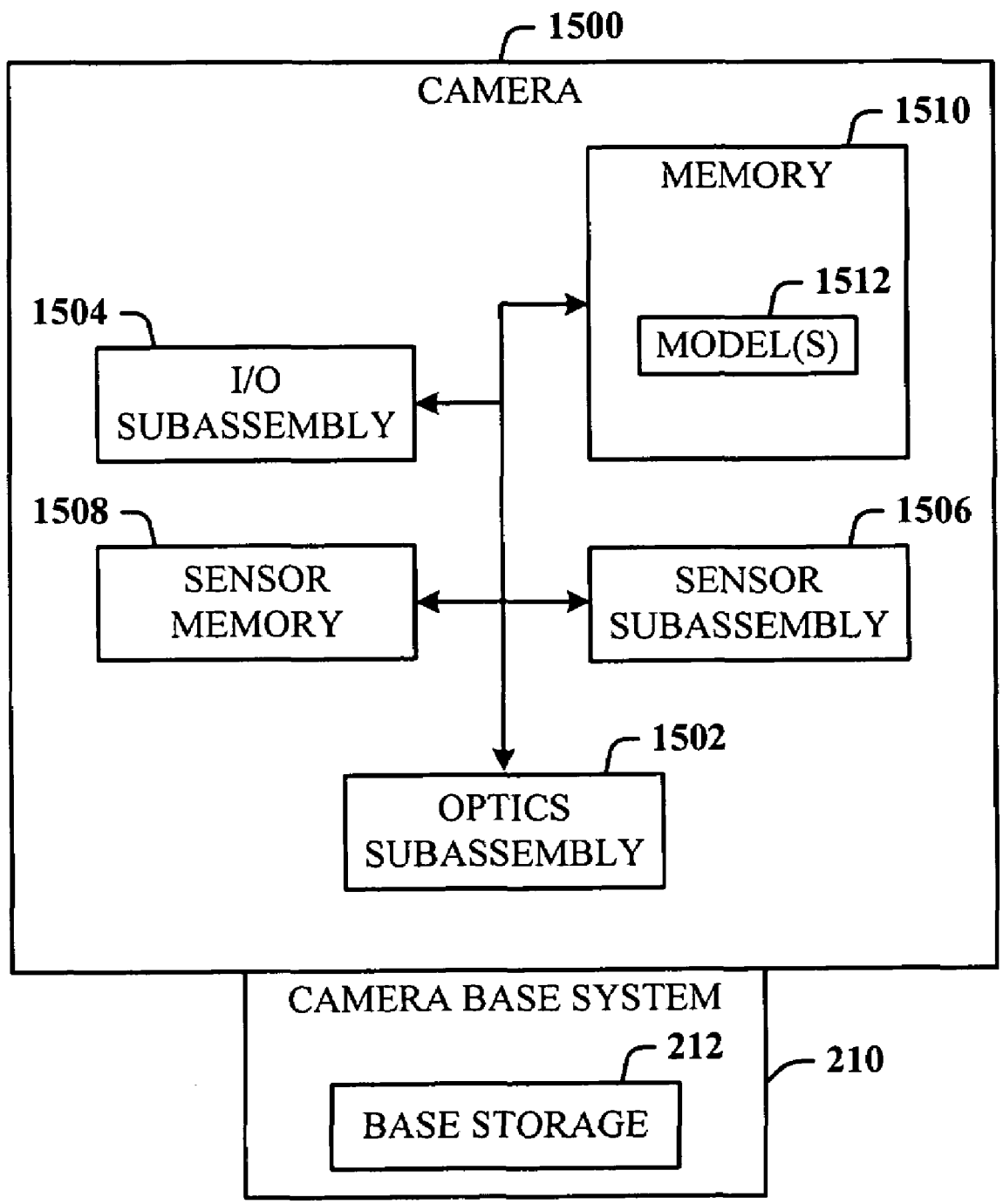
FIG. 15 illustrates a block diagram of an exemplary panoramic video camera for calibration and utilization in accordance with the disclosed architecture.

FIG. 15 illustrates a block diagram of an exemplary panoramic video camera 1400 for calibration and utilization in accordance with the disclosed architecture. The camera 1500 can include an optics subassembly 1502 for optically receiving image data from scenes. External power can be provided via an I/O subassembly 1504 which provides the wired interface and ports for power as well as data and signaling for the camera 1500. Additionally, the I/O subassembly 1504 can also include wireless communications capability for communicating signals and/or data between the camera 1500 and external systems. The I/O subassembly 1504 can further employ a high-speed parallel bus to the base stabilization subsystem for ultimate communications to external systems (e.g., a computer).

The camera 1500 also includes a sensor subassembly 1506 (e.g., imager, CCD-charged coupling device) for sensing and capturing scene images coupled through from the optics subassembly 1504. The sensor subassembly 1506 can store captured data into a dedicated sensor memory 1508 (e.g., a fast non-volatile memory). A memory 1510 can be employed to store one or more models (e.g., homography, affine, . . . ) in support of calibration processes; however, these memories (1508 and 1510) can be in a single unit.

The memory 1510 can be employed to store one or more homographies 1512 for calibration purposes. Additionally, the memory can store one or more programs 1514, for example, code that facilitates I/O communications, optics data and memory management, for example.

The camera base system 210 includes the base memory storage 212 for storing the manufacturing data (denoted Z), and code for generating a non-parametric stitching table from the combination Z+H.

Note that as used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, a camera, camera subassembly, camera subsystem, and/or a computer. By way of illustration, both an application running on a camera and the camera can be a component. One or more components can reside within a process and/or thread of execution, and a component can be localized on one computer and/or distributed between two or more computers.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates spatial calibration of a multi-sensor panoramic camera, comprising:
    a model component for generating a parametric model of data associated with the camera;
    a storage component for storing the parametric model in association with the camera; and
    a calibration component that employs the parametric model for spatial calibration of the camera.

2. The system of claim 1, wherein the parametric model is specific to the camera and corrects for manufacturing errors.

3. The system of claim 1, wherein the parametric model is stored on the camera.

4. The system of claim 1, wherein the parametric model includes a polynomial and homography.

5. The system of claim 1, wherein the calibration employs a non-parametric model in combination with the parametric model for spatial calibration of the camera.

6. The system of claim 1, wherein the parametric model generated by the model component includes a homography process and a warp process which are employed for spatial calibration.

7. The system of claim 1, wherein the calibration component employs a dual parametric approach associated with a seam region of multiple calibration images by applying a warp process for the seam region and the parametric model away from the seam region.

8. The system of claim 7, wherein the warp process is characterized by a polynomial equation.

9. The system of claim 1, wherein the calibration component employs an intra-camera homography that optimizes homography for each sensor independently.

10. The system of claim 1, wherein the calibration component employs inter-camera homography that estimates homographies which minimize stitching error for all sensors substantially simultaneously.

11. The system of claim 1, wherein the calibration component employs multiple homographies to correct for manufacturing errors in a camera model.

12. The system of claim 1, further comprising a calibration system configuration for calibrating a multi-sensor camera system, the multi-sensor system mounted in a fixed position in the system configuration, and each sensor processes a single spatial calibration pattern.

13. The system of claim 1, further comprising a calibration system configuration for calibrating a multi-sensor system of panoramic cameras, the multi-sensor system mounted on a rotation table in the system configuration, and each sensor is rotated to a single spatial calibration pattern.

14. A method of calibrating a multi-sensor panoramic camera system, comprising:
    generating a parametric model of a panoramic camera, the model including at least one of diagnostics and manufacturing data;
    storing the parametric model in a non-volatile memory of the camera; and
    calibrating the camera spatially by processing a spatial calibration pattern through the camera using the parametric model.

15. The method of claim 14, further comprising calibrating the multi-sensor system according to intra-camera homography by mapping pattern image points to panorama points.

16. The method of claim 14, further comprising calibrating the multi-sensor system by estimating homographies that minimize stitching error for each of the panoramic cameras of the multi-sensor system substantially simultaneously.

17. The method of claim 14, further comprising:
    calibrating the multi-sensor system independent of a test pattern by employing a multi-person detection process; and
    continuously updating calibration parameters based on changing conditions in which the multi-sensor system.

18. The method of claim 14, further comprising solving for homography H with points located at least one of in an overlap region and mostly in the overlap region.

19. The method of claim 14, further comprising performing sub-pixel calibration at a seam of two or more test pattern images using a generic warp function.

20. An article of manufacture comprising a storage medium containing instructions that when executed enable a system to:
    receive manufacturing data that defines a manufacturing model associated with manufacture of a panoramic camera;
    correct the manufacturing model using homography and warp functions against spatial test patterns to account for at least one of diagnostics and manufacturing data; and
    store the modified manufacturing model as a parametric model in a non-volatile memory of the camera.

* * * * *